UNITED STATES PATENT OFFICE.

AUGUST NETTE, OF SAN ANTONIO, TEXAS.

IMPROVEMENT IN TAPE-WORM MEDICINES.

Specification forming part of Letters Patent No. 219,825, dated September 23, 1879; application filed June 11, 1879.

*To all whom it may concern:*

Be it known that I, AUGUST NETTE, of the city of San Antonio, in the county of Bexar, in the State of Texas, have invented a new and useful compound called "Tape-Worm Medicine," which compound is fully described in the following specification.

This invention relates to that class of compounds used to remove tape-worms from the human body speedily and effectually; and it consists in a composition formed from the fibrils of the roots of the pomegranate mixed with water.

To prepare the tape-worm medicine, take the fibrils of the roots of the pomegranate, gathered in the months of December and January; scrape off the outer crust or bark of the roots, cut up the inner rind and small fibrils, pound and digest them for twelve hours in water in a percolator, concoct in a water-bath, and strain through a fine woolen cloth; place the solution in a basin until it is evaporated to the consistency of ordinary extracts; place the solution thus evaporated upon porcelain or glass plates in a dry chest, and let it evaporate until it is perfectly dry; take it from the plates, pulverize, and place the powder in small dry well-corked vials.

This tape-worm medicine will not decompose or be affected by age, but will retain its efficiency for any length of time.

I claim—

A dried aqueous extract of roots of pomegranate, prepared from the decoction and free from fibrous matters.

AUGUST NETTE.

Witnesses:
F. WILD,
THEO. ELCHLEPP.